United States Patent [19]

Willison

[11] Patent Number: 5,535,638

[45] Date of Patent: Jul. 16, 1996

[54] ANTIFRICTION SCREW DRIVE

[75] Inventor: Robert H. Willison, Cincinnati, Ohio

[73] Assignee: Cincinnati Milacron Inc., Cincinnati, Ohio

[21] Appl. No.: 336,899

[22] Filed: Nov. 10, 1994

[51] Int. Cl.⁶ .................................................. F16H 25/22
[52] U.S. Cl. ........................ 74/459; 74/424.8 NA
[58] Field of Search ....................... 74/459, 424.8 NA

[56]  References Cited

U.S. PATENT DOCUMENTS

| | | | |
|---|---|---|---|
| 1,154,519 | 9/1915 | Landsowne | 74/459 |
| 1,367,499 | 2/1921 | Rafson | 74/459 |
| 1,810,910 | 6/1931 | Esmond | 74/459 |
| 1,831,080 | 11/1931 | Schmidt | 74/459 |
| 2,833,156 | 5/1958 | Spontelli | 74/459 |
| 2,855,791 | 10/1958 | Hogan | 74/459 |
| 3,055,230 | 9/1962 | Strassberg | 74/424.8 |
| 3,056,311 | 10/1962 | Musser | 74/424.8 |
| 3,244,022 | 4/1966 | Wysong, Jr. | 74/424.8 |
| 3,327,551 | 6/1967 | Prueter | 74/424.8 |
| 3,393,577 | 7/1968 | Better | 74/424.8 |
| 3,422,696 | 1/1969 | Valenti | 74/424.8 |
| 3,661,030 | 5/1972 | Gagne | 74/459 |
| 3,673,886 | 7/1972 | Tomita et al. | 74/424.8 |
| 4,221,137 | 9/1980 | Futaba | 74/216.3 |
| 4,677,869 | 7/1987 | Mayfield | 74/424.8 |
| 4,680,982 | 7/1987 | Wilke et al. | 74/424.8 |
| 4,795,172 | 1/1989 | Brande | 277/165 |
| 4,821,592 | 4/1989 | Rousselot | 74/424.8 |
| 4,864,883 | 9/1989 | Mayfield | 74/424.8 |
| 5,241,874 | 9/1993 | Matsuhama | 74/424.8 |

FOREIGN PATENT DOCUMENTS

| | | | |
|---|---|---|---|
| 0281491 | 9/1988 | European Pat. Off. | F16C 31/06 |
| 1406974 | 9/1975 | United Kingdom . | |
| 1406974 | 9/1975 | United Kingdom | F16H 25/22 |

OTHER PUBLICATIONS

Machine Shop Theory and Practice, A. M. Waggener and H. R. Arthur, D. Van Nostrand Company, Inc., New York, NY, pp. 117–119.

Power Transmission Design, 1995 Handbook Issue, Penton Publishing Inc. pp. A 307–A 315.

Machinery's Handbook, 23rd Edition, Oberg, Jones and Horton, Industrial Press, Inc. 1990, pp. 1585–1591.

Translation of German Published Patent Appln. 2,352,454, entitled Ball and Screw Gear, Ta Technique Integrale S.A.

Primary Examiner—Charles A. Marmor
Assistant Examiner—David Fenstermacher
Attorney, Agent, or Firm—Thomas M. Farrell

[57]  ABSTRACT

A screw and nut have intermeshed helical threads which may be of a form selected from a variety of shapes; for example, a buttress thread. A ball track is formed by cooperating grooves in opposing flanks of the screw and nut threads, and a circuit of balls are disposed within the ball track. The result is a screw system with improved thrust load-carrying capability.

12 Claims, 4 Drawing Sheets

ANTIFRICTION SCREW DRIVE

FIELD OF THE INVENTION

The invention relates to screw drive systems, particularly those employing antifriction rolling elements, such as balls, to transmit forces and motion between a screw and a nut.

BACKGROUND OF THE INVENTION

Antifriction screw drive systems are well-known, in which rolling elements are interposed between a screw and nut pair to enable the system to operate at low friction and high efficiency. The most common antifriction screw drive system is the conventional ballscrew and companion ball nut, an example of which is shown in the sectional view of prior art FIG. 1, herein. In FIG. 1, the nut 10 is affixed, for example, to a moving member, while the ballscrew 11 is supported by a stationary member for rotation about the screw's longitudinal axis 12. The ballscrew 11 has a semi-circular groove 13 machined into its outer diameter 14, the groove 13 being of constant lead (i.e., constant axial advancement per revolution), and the nut 10 has a mating semi-circular groove 15 machined within its bore 16; balls 17 disposed within the grooves 13,15 of the nut 10 and screw 11 provide the connection. The pitch diameter 18, an imaginary cylinder along which the centers of the balls 17 are disposed, is between the screw's outer diameter 14 and the nut bore 16. This conventional structure for a ballscrew facilitates ease of manufacture and assembly. The cross-sectional shapes of the grooves may vary from that which is completely semi-circular yet of slightly larger radius than the balls, which will result in a point contact of the ball with the groove, to a gothic arch shape, i.e., where two separate radii are used to form the groove and, with preload (e.g., that provided by use of oversized balls), the ball will contact two points, one at each side of the groove in a manner well-known in the ballscrew art.

Many, perhaps most, conventional ballscrew assemblies employ an endless ball circuit, in which balls are guided out of the ball groove at one end of the nut, and routed back to the other end of the nut for re-entry into the ball groove. Often balls are routed through an external return tube, and sometimes they are routed through a return hole drilled through the nut body. In still other instances, balls have been routed through a return passageway within the screw.

German patent application 2352454, published May 22, 1974 illustrates a somewhat unconventional ballscrew drive entitled Ball and Screw Gear. This prior art device, depicted in FIG. 2, herein, proposes a ballscrew and nut combination 19 where the resulting nut 20 has a reduced outer envelope, when compared with prior ball nuts which use external ball returns or ball returns passing through an axial hole in the ball nut. To accomplish the desired result, the screw 21, rotatable about its longitudinal axis 22, is provided with a thin helical thread 23 which intermeshes with, but does not touch, the thin helical thread 24 of the nonrotating nut 20; i.e., the threads 23,24 are very thin when compared to the pitch (pitch being the axial distance between corresponding points on the thread). The threads 23,24 are sized such that when in mesh, two chambers 25,26 are formed between the screw thread flanks 27,28 and nut thread flanks 29,30 so that balls 31 will migrate under thrust load through one of the chambers 25 as the drive is in motion; the second, slightly larger chamber 26 provides a return path for the balls 31 circulating back to the start of the nut 20. When reversing motion, there is a slight relative axial shift between the screw 21 and nut 20, as the clearance is taken up, and the balls 31 in the second chamber 26 become the load bearing balls. Accordingly, the formerly load bearing ball chamber 25 now becomes the clearance chamber for the recirculating balls 31. Obviously, this device has certain inherent drawbacks; e.g., (1) a lost motion occurs when reversing direction, and (2) as those skilled in the art will appreciate, the load bearing balls of the relatively rotating screw migrate at a speed less than the pitch line speed of the screw, but in the same direction, whereas the returning balls in the second chamber are moving in a direction opposite to that of the screw, and would, presumably, experience skidding and consequent wear.

One problem with many conventional ballscrew assemblies is the fact that when thrusting in one direction, the ball and respective groove of the screw and nut have single point contact which can result in great wear of the assembly and consequent degradation of the elements.

The invention contained herein obviates many of the problems associated with prior art screw and nut systems. In a preferred embodiment, helical flights are provided on a screw, and within a nut. A plurality of balls are seated within a ball track, formed by suitable ball grooves manufactured within oppositely disposed faces of the respective flights. The result is a screw system with, generally, more thrust load carrying capability and with more contact points to reduce wear.

SUMMARY OF THE INVENTION

The invention is shown embodied in a screw system, comprising: a screw shaft, having a helical screw thread formed thereon, about a longitudinal centerline, the screw thread having a root, a crest, and a pair of opposing screw flanks connecting the root and crest; a nut, having a helical nut thread formed within, the nut thread being complementarily mated to mesh with the screw thread, the nut thread having a pair of opposing nut flanks corresponding to the pair of screw flanks; a first helical groove formed within one of the screw flanks; a second helical groove formed within one of the nut flanks, the second groove facing the first groove; and, a plurality of rolling elements disposed within the first and second grooves.

DESCRIPTION OF THE INVENTION

Figure 1:
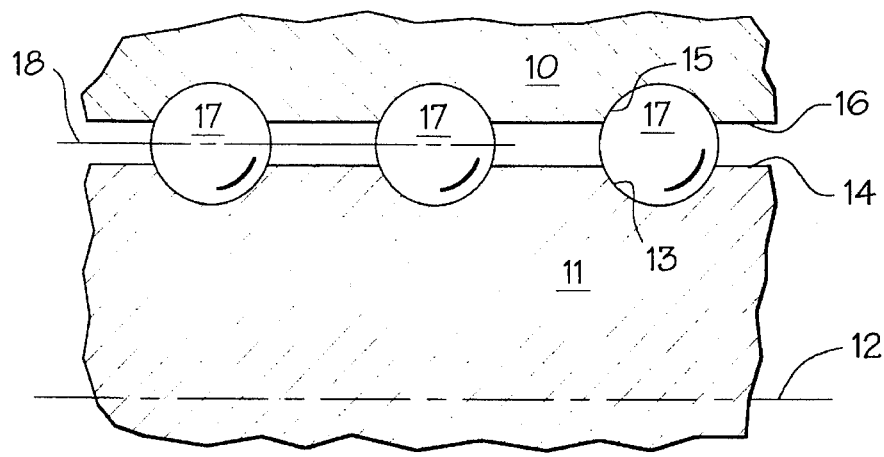
FIG. 1 is a sectional view, taken along the longitudinal axis of a screw and nut of the prior art.
Figure 2:
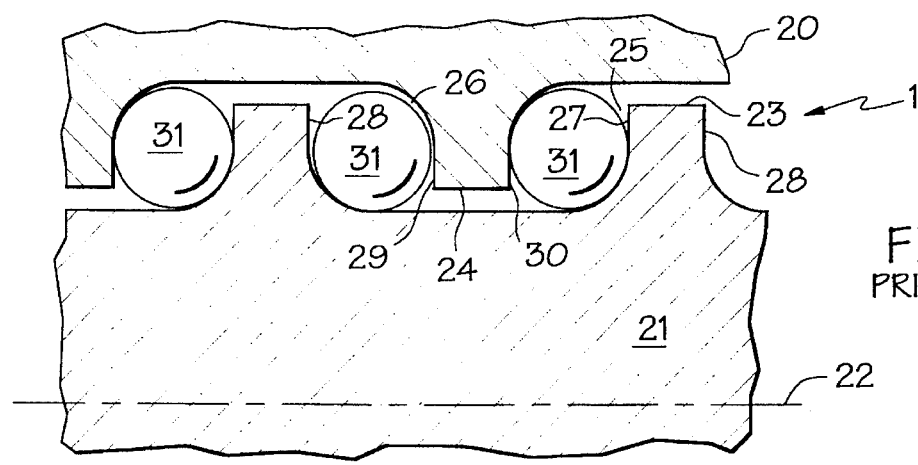
FIG. 2 is a sectional view, taken along the longitudinal axis of a ballscrew assembly of the prior art, where the ball return path lies along the screw surface.
Figure 3:
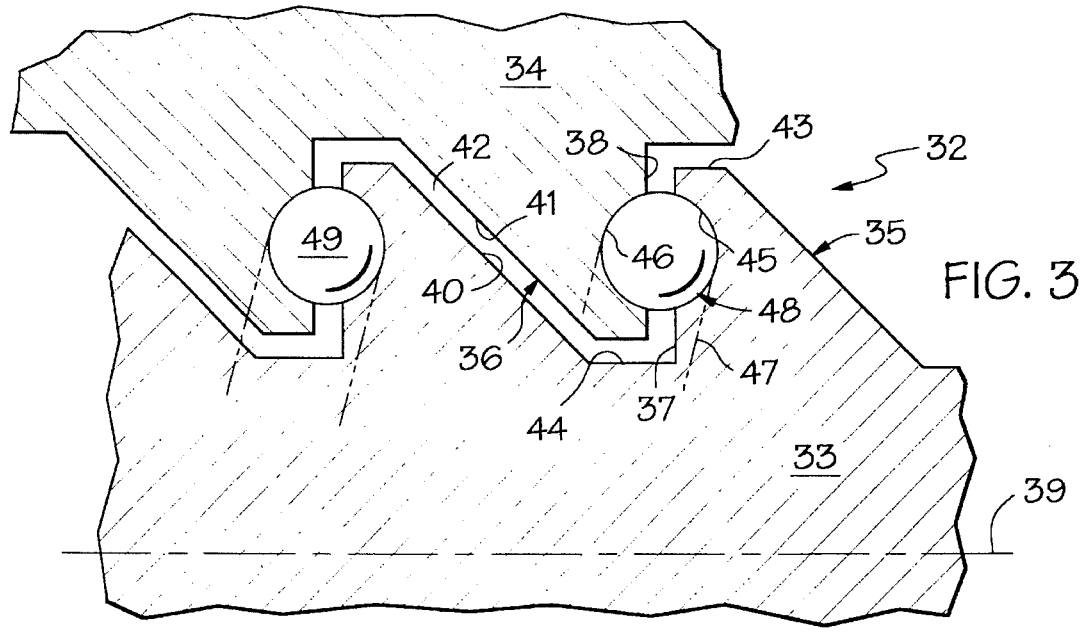
FIG. 3 is a sectional view, taken along the longitudinal axis of the inventive screw and nut assembly, illustrating a single ball train between opposing screw and nut pressure flanks (normal to the axis) of a buttress screw assembly.

Referring now to FIG. 3 of the drawings, which is a sectional view taken along the longitudinal axis of a screw and nut assembly 32, the screw 33 and nut 34 are provided with threads 35,36 of the buttress thread form, that is, having what are commonly called the contacting or pressure flanks 37,38 of the threads 35,36 extending normally to the longitudinal axis 39. The trailing or clearance flanks 40,41 are inclined approximately 45° to the axis 39; the clearance space 42 is shown greatly exaggerated. The screw 33 has a crest portion 43 comprising its outer diameter, and a root portion 44 connecting the respective flanks 37,40, to establish the flight or thread 35. The nut is similarly formed. A unique antifriction screw and nut system is achieved by placing helical grooves 45,46 into the opposing pressure flanks 37,38 of the screw 33 and nut 34. The helical grooves 45,46 establish a helical ball track 47 into which a ball train 48 is placed. In its simplest form, to establish a screw system having a finite length of travel, the ball train 48 may comprise a non-recirculating plurality of balls 49, and the nut 34 is sized so that it may travel relative to the screw 33 without allowing the balls 49 to exit the ball track 47. This, however, is a very limited application of the invention. In its more versatile form the ball train 48 is an endless circuit, where the balls 49 exit the ball track 47 at one end and return by way of external means (not shown) to the start of the ball track 47 at the opposite end of the nut 34, in a manner employed with conventional ballscrews; i.e., the balls 49 are taken from one end of the nut thread 36 through an end closure (not shown in FIG. 3), transferred to either a return tube or a return hole through the nut 34, and fed through an end closure at the beginning end of the nut 34 to re-enter the thread 36 and complete the circuit. A ballscrew of the form shown in FIG. 3 is capable of high thrust loads. If the gothic arch form for the ball grooves is utilized, multiple contact points will exist for each ball in the track at all times.

Figure 4:
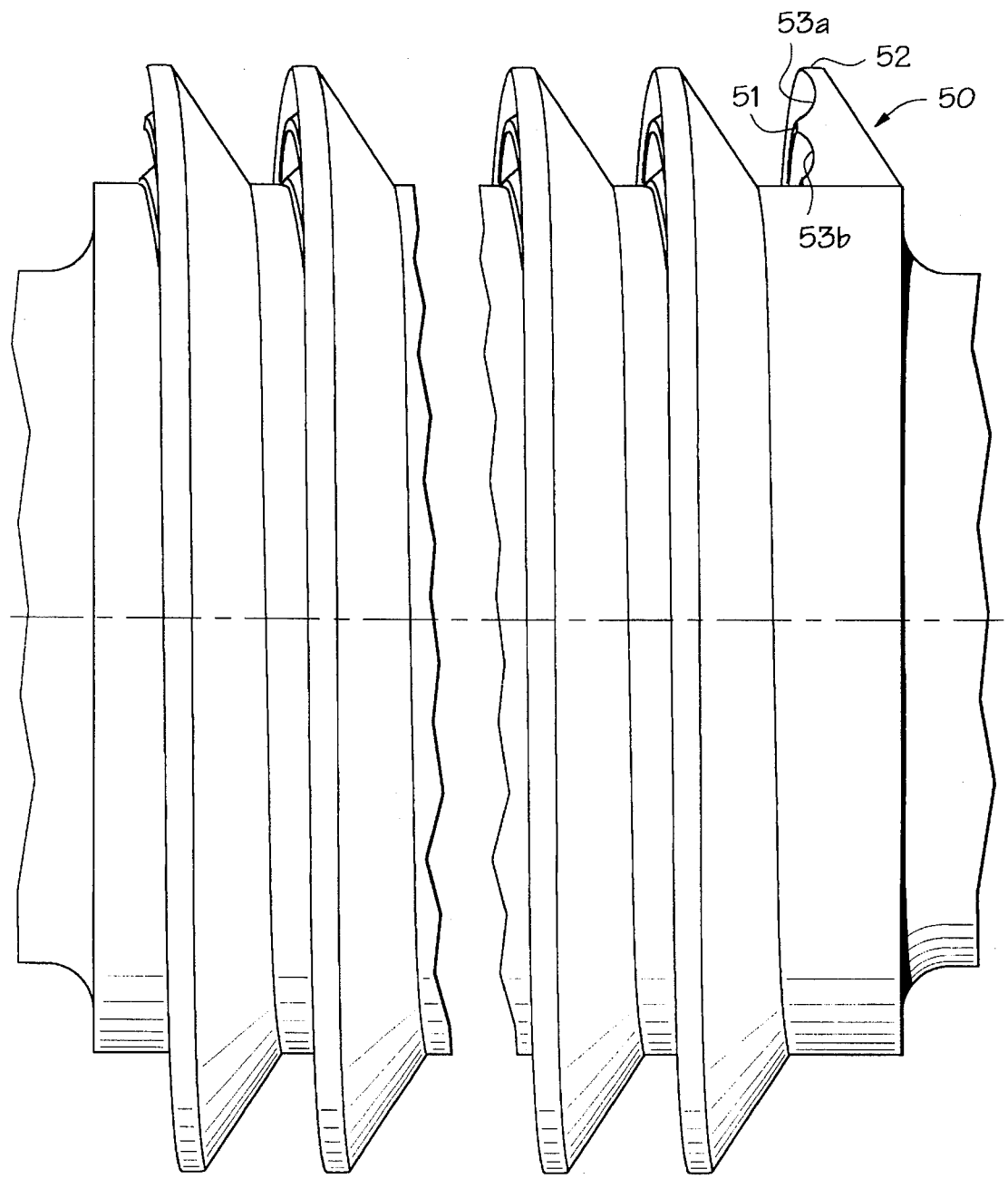
FIG. 4 is a side view of a buttress screw, having a pair of grooves formed into the pressure flank of the thread.
Figure 5:
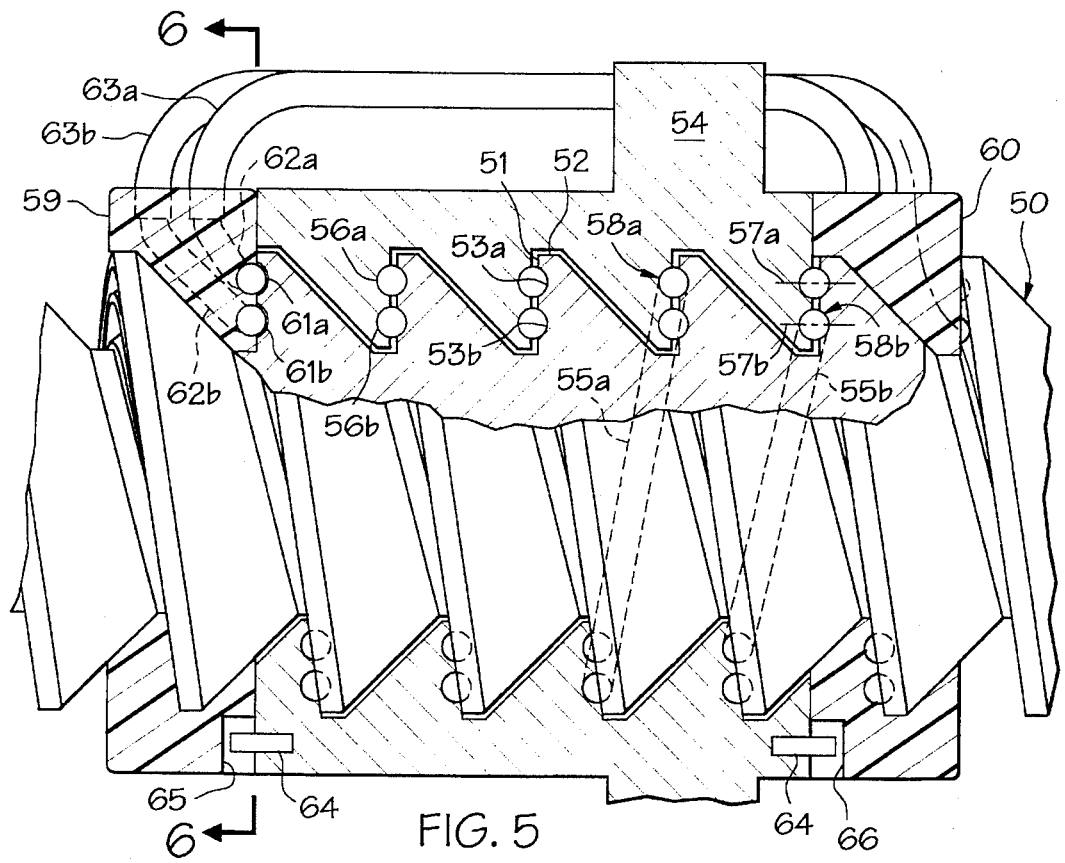
FIG. 5 is a sectional view, taken along the longitudinal axis of a buttress screw assembly, illustrating the screw of FIG. 4, with a mating nut, and rolling elements connecting the screw and nut.

Referring now jointly to FIGS. 4 and 5, a buttress screw 50 is depicted, and the pressure face 51 of the buttress thread 52 is provided with two independent grooves 53a,b which, in combination with a correspondingly-grooved mating nut 54 (FIG. 5), will establish first and second helical ball tracks 55a,b which are of the same lead and pitch. The screw 50, nut 54 and balls 56a,b, are made, for example, of hardened steel. The outer and inner ball tracks 55a,b are completely independent of one another and are located on two separate pitch diameters 57a,b. In FIG. 5, a preferred form of this dual track ballscrew 50 is shown, where the first and second tracks 55a,b contain independent first and second ball trains 58a,b which are endless circuits, as previously described in connection with FIG. 3. In this manner, the nut 54 is capable of infinite travel and the load carrying capability of such a screw is very great when compared with prior art ballscrews. Furthermore, when compared with single circuit screws, the increased number of contact points in this screw 50 results in improved wear capability. The ball nut 54 in FIG. 5 has left and right end closures 59,60, which serve to wipe the screw thread 52 and recirculate, or transfer the balls 56a,b from one end of the nut 54 to the other. The closures 59,60 are made, for example, of molded plastic, sized to closely-conform to the screw thread 52.

Figure 6:
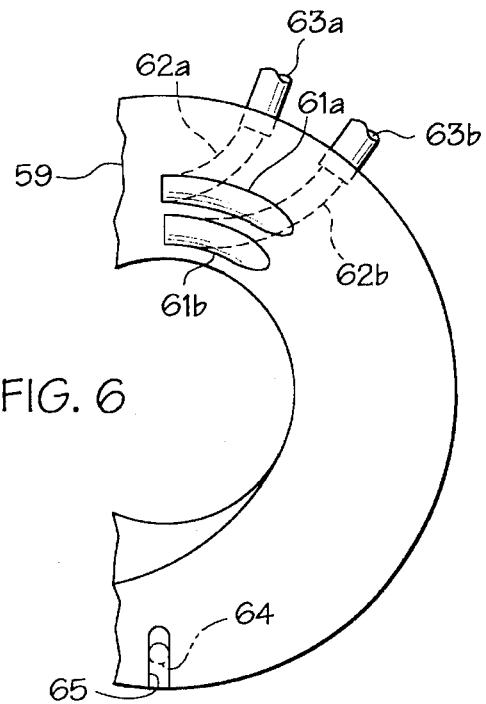
FIG. 6 is an elevational view of the left end ball nut closure, taken along the line 6—6 of FIG. 5.

With brief reference also to FIG. 6, the left end closure 59 has a pair of facial ridges 61a,b which conform to the ball grooves 53a,b in the screw 50; the right closure 60 is similarly-formed. A pair of channels 62a,b running through the ridges 61a,b connect the ball grooves 53a,b to a pair of external return tubes 63a,b which connect to the right end closure 60, where suitable channels (not shown) re-connect the tubes 63a,b to the ball grooves 53a,b. In a manner similar to that taught in U.S. Pat. No. 4,677,869, the entire disclosure of which is incorporated herein by reference, the end closures 59,60 are maintained in position by the close fit with the screw 50, and by means of pins 64 extending into radial slots 65,66 in the closures 59,60, prevent relative rotation between the nut 54 and closures 59,60. The slots 65,66 permit some relative radial thermal growth to occur between the plastic closures 59,60 and steel nut 54.

Figure 7A:
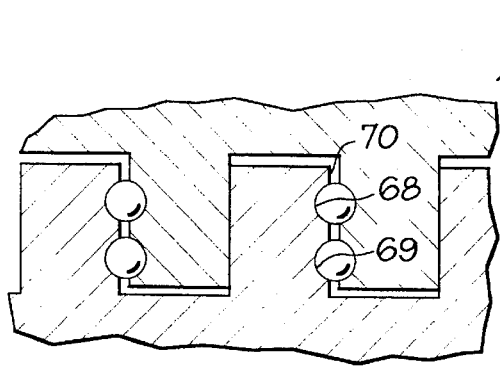
FIGS. 7a–d are sectional views illustrating alternate embodiments of the invention.

FIG. 7a shows a square thread assembly 67 having dual ball tracks 68,69 in one flank 70.

Figure 7B:
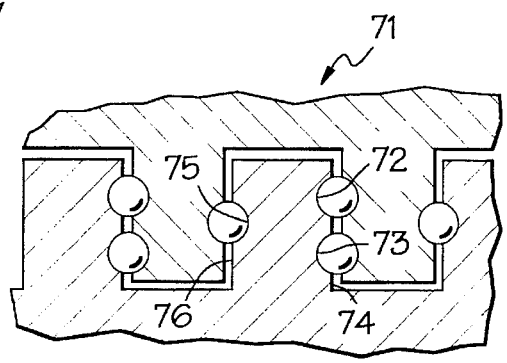

FIG. 7b illustrates a square thread assembly 71 having dual ball tracks 72,73 at one screw flank 74 and a single ball track 75 in the opposite screw flank 76, where the assembly 71 sees a greater load in one direction than the other.

Figure 7D:
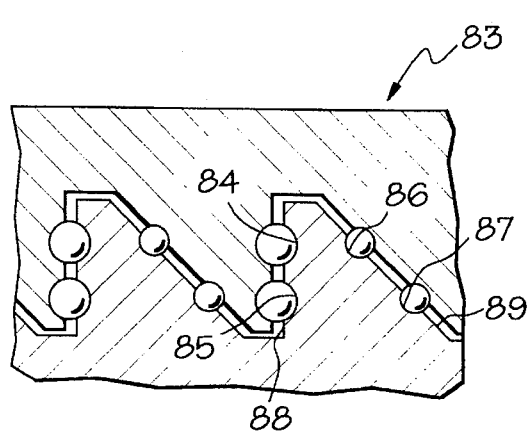
Figure 7C:
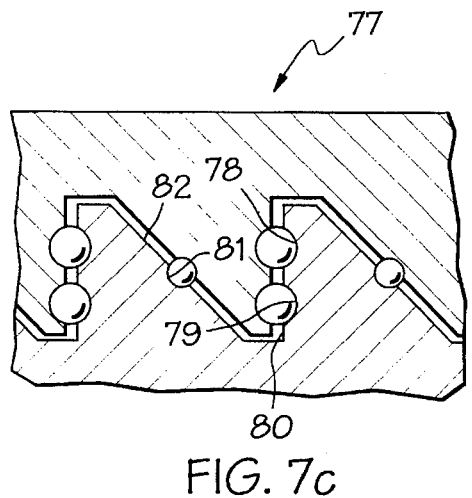

FIG. 7c illustrates a buttress thread assembly 77 having dual ball tracks 78,79 in the screw pressure flank 80 and a single ball track 81 in the screw clearance flank 82, similar to the embodiment of FIG. 7b.

FIG. 7d illustrates a buttress thread assembly 83 having dual ball tracks 84,85,86,87 in each screw flank 88,89; i.e., there are four independent ball circuits. It will be appreciated from the teachings herein that more than two ball circuits may be employed within a common flank of a thread.

It may be noted that the ball size may vary from one track to another to suit particular design applications, and it will be appreciated that rollers other than balls may be substituted in certain applications.

While the invention has been shown in connection with several embodiments, it is not intended that the invention be so limited; rather, the invention extends to all such designs and modifications as come within the scope of the appended claims.

What is claimed is:

1. A screw system, comprising:

a screw shaft, having a helical screw thread formed thereon, about a longitudinal axis, said screw thread having a root, a crest, and a pair of opposing screw flanks connecting said root and crest;

a nut, having a helical nut thread formed within, said nut thread being complementarily mated to mesh with said screw thread, and said nut thread having a pair of opposing nut flanks corresponding to said pair of screw flanks;

at least a first pitch diameter defined about said axis;

at least a second pitch diameter defined about said axis, said second pitch diameter being smaller than said first pitch diameter;

at least a first helical track formed into adjacent screw and nut flanks, along said first pitch diameter;

at least a second helical track formed into said adjacent screw and nut flanks, along said second pitch diameter;

a first plurality of rolling elements located in said first helical track; and a second plurality of rolling elements located in said second helical track, said second plurality of rolling elements being independent of said first plurality of rolling elements.

2. A screw system according to claim 1, wherein said first and second tracks are ball tracks, and wherein said rolling elements are balls.

3. A screw system, comprising:

a screw shaft, having a helical screw thread formed thereon, about a longitudinal axis, said screw thread having a root, a crest, and a pair of opposing screw flanks connecting said root and crest, at least one of said flanks being substantially normally extending with respect to said axis;

a nut, having a helical nut thread formed within, said nut thread being complementarily mated to mesh with said screw thread, and said nut thread having a pair of opposing nut flanks corresponding to said pair of screw flanks, at least one of said nut flanks being substantially normally extending with respect to said axis;

at least a first pitch diameter defined about said axis;

at least a second pitch diameter defined about said axis, said second pitch diameter being smaller than said first pitch diameter;

at least a first helical track formed into adjacent substantially normally extending screw and nut flanks, along said first pitch diameter;

at least a second helical track formed into said adjacent substantially normally extending screw and nut flanks, along said second pitch diameter;

a first plurality of rolling elements located in said first helical track; and a second plurality of rolling elements located in said second helical track, said second plurality of rolling elements being independent of said first plurality of rolling elements.

4. A screw system according to claim 3, wherein said first and second tracks are ball tracks, and wherein said rolling elements are balls.

5. A screw system according to claim 4, wherein said helical screw thread is a buttress screw thread.

6. A screw system according to claim 4, wherein said helical screw thread is a square screw thread.

7. A screw, comprising:

a screw shaft, having a helical screw thread formed thereon, about a longitudinal axis, said screw thread having a root, a crest, and a pair of opposing screw flanks connecting said root and crest;

at least a first pitch diameter defined about said axis;

at least a second pitch diameter defined about said axis, said second pitch diameter being smaller than said first pitch diameter;

at least a first helical groove formed into one of said screw flanks, along aid first pitch diameter; and at least a second helical groove formed into said one of said screw flanks, along said second pitch diameter.

8. A screw according to claim 7, wherein said first and second grooves are ball grooves.

9. A screw according to claim 7, wherein said one of said screw flanks is substantially normal to said axis.

10. A screw according to claim 9, wherein said first and second grooves are ball grooves.

11. A screw according to claim 10, wherein said helical screw thread is a buttress thread.

12. A screw according to claim 10, wherein said helical screw thread is a square thread.

* * * * *